(12) United States Patent
Mao et al.

(10) Patent No.: US 9,929,630 B2
(45) Date of Patent: Mar. 27, 2018

(54) VIBRATING MOTOR

(71) Applicants: Lubin Mao, Shenzhen (CN); Hongxing Wang, Shenzhen (CN)

(72) Inventors: Lubin Mao, Shenzhen (CN); Hongxing Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 273 days.

(21) Appl. No.: 15/061,222

(22) Filed: Mar. 4, 2016

(65) Prior Publication Data

US 2017/0033651 A1 Feb. 2, 2017

(30) Foreign Application Priority Data

Jul. 31, 2015 (CN) .......................... 2015 1 0464827

(51) Int. Cl.
*H02K 33/00* (2006.01)
*H02K 5/24* (2006.01)
*H02K 5/10* (2006.01)
*H02K 33/16* (2006.01)

(52) U.S. Cl.
CPC ................................... *H02K 33/16* (2013.01)

(58) Field of Classification Search
CPC ................................ H02K 5/20; H02K 33/00

USPC ................................... 310/15, 25, 36, 51, 81
See application file for complete search history.

(56) References Cited

U.S. PATENT DOCUMENTS

| 2011/0018365 A1* | 1/2011 | Kim ..................... B06B 1/045 310/17 |
| 2011/0203061 A1* | 8/2011 | Takahashi .............. A61C 17/32 15/22.1 |
| 2012/0104875 A1* | 5/2012 | Park ...................... H02K 33/16 310/25 |
| 2013/0313919 A1* | 11/2013 | Nakamura ............. H02K 33/00 310/25 |

* cited by examiner

*Primary Examiner* — Jose Gonzalez Quinones
(74) *Attorney, Agent, or Firm* — Na Xu; IPro, PLLC

(57) ABSTRACT

A vibrating motor is provided in the present disclosure. The vibrating motor includes a shell providing an accommodating space, a vibrating system accommodated in the accommodating space, and a pair of elastic connectors for elastically connecting two opposite ends of the vibrating system with the shell. The vibrating system includes a first vibrating unit and a second vibrating unit opposite to each other. Each of the elastic connectors includes a fixing portion, a first elastic arm and a second elastic arm; the fixing portion is fixed to the shell, the first elastic arm and the second elastic arm are parallel to each other and extend from a same end of the fixing portion, and are configured for elastically suspending the first vibrating unit and the second vibrating unit respectively.

18 Claims, 3 Drawing Sheets

VIBRATING MOTOR

FIELD OF THE DISCLOSURE

The present disclosure generally relates to vibrator technologies, and more particularly, to a vibrating motor applicable to an electronic device for providing vibration feedback.

BACKGROUND

With development of electronic technologies, electronic devices, such as mobile phones, handheld game players, tablet computers, portable multimedia players, or the like, become more and more popular. A typical electronic device includes a vibrating motor for providing vibration feedback. For example, a vibrating motor may be used in a mobile phone for providing vibration prompting while receiving an incoming call or a message such as a short message, a multimedia message, an instant message, or a push message.

Due to a miniaturization trend of the electronic device, the vibrating motor is required to have a small size; however, this may impact a vibration intensity of the vibrating motor. To enhance the vibration intensity, a related vibrating motor employs multiple elastic connectors for providing more vibration energy and restricting a vibration range of the vibrating motor. Nevertheless, the multiple elastic connectors increase assembling complexity of the vibrating motor, and lower an assembly efficiency of the vibrating motor.

Therefore, it is desired to provide a vibrating motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and embodiments thereof.

Figure 1:
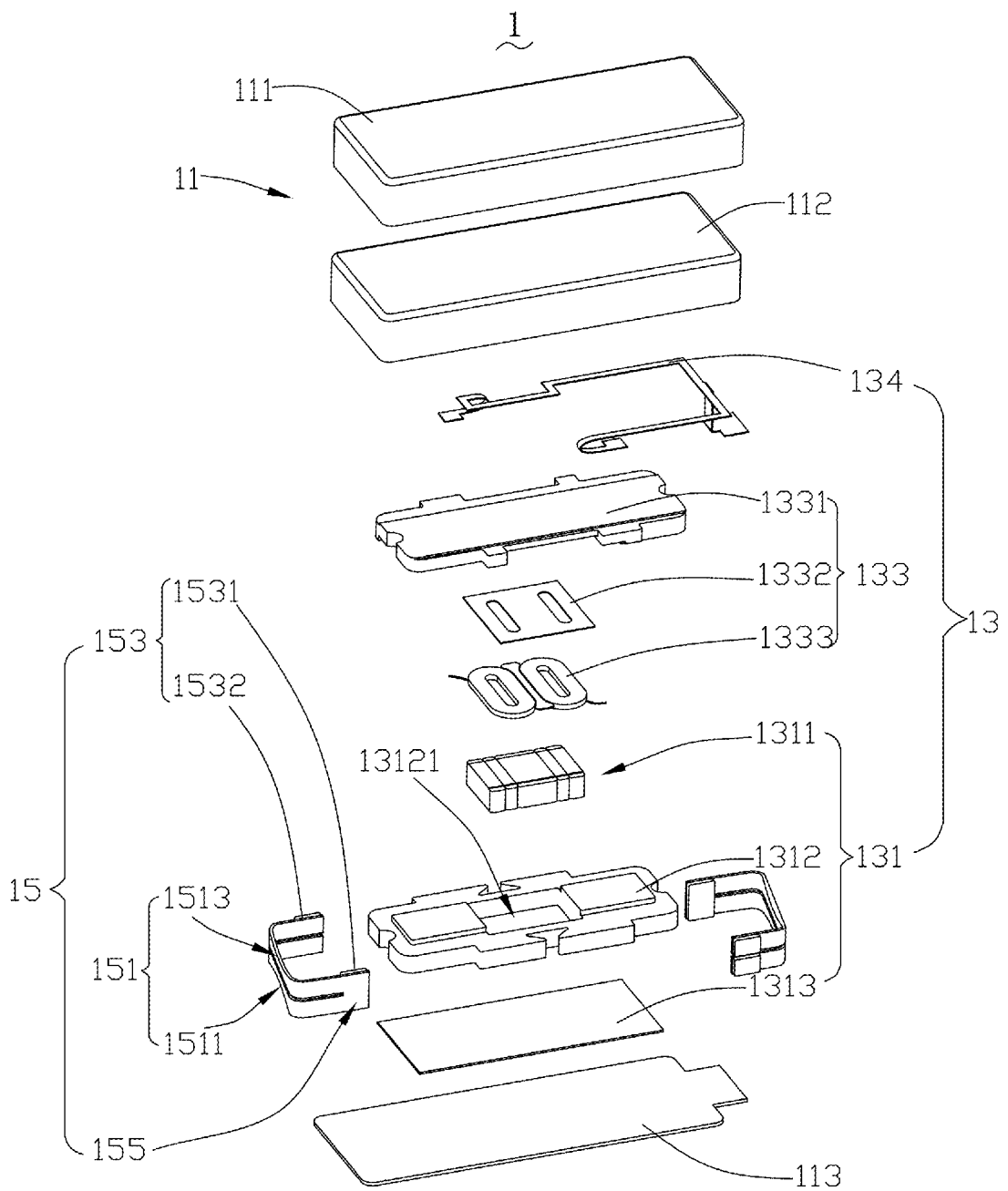
FIG. 1 is an exploded view of a vibrating motor according to an exemplary embodiment of the present disclosure.
Figure 2:
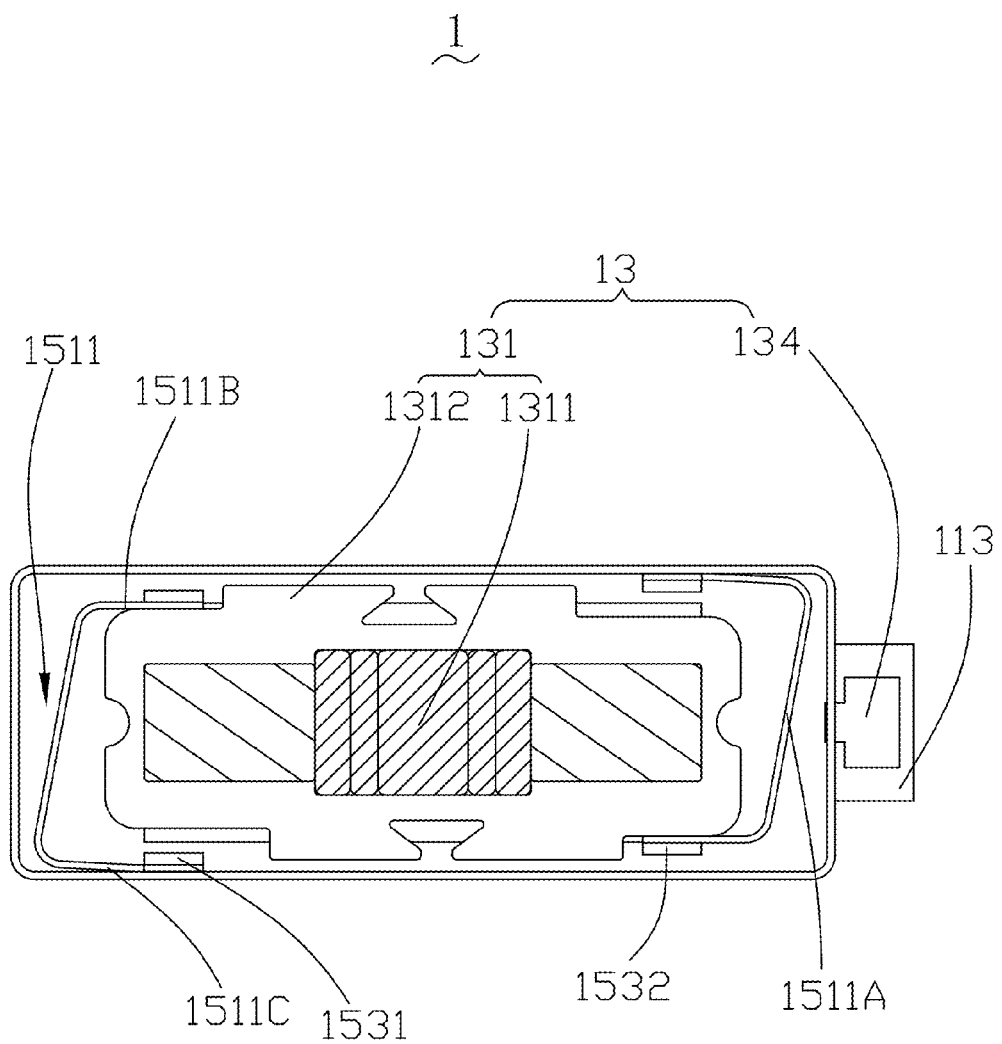
FIG. 2 is a cross-sectional view of the vibrating motor of FIG. 1.

Referring to FIGS. 1-2, a vibrating motor 1 according to an exemplary embodiment of the present disclosure is shown. The vibrating motor 1 includes a shell 11, a vibrating system 13 and a pair of elastic connectors 15.

The shell 11 includes a first cover 112, a second cover 111 and a base 113. Both the first cover 112 and the second cover 111 have a box-like structure with an opening facing the base 113. The first cover 112 and the second cover 111 may serve as an inner cover and an outer cover of the shell 11, and the second cover 111 has a size greater than that of the first cover 112. The first cover 112 may cover the base 113 form an accommodating space, and the second cover 111 is further arranged outside the first cover 112 and also covers the base 113.

The base 113 may be a flat plate, which includes a supporting platform extending from an end of the base 113, the supporting platform is coplanar with a main surface of the base 113, and is not covered by the shell 11.

The vibrating system 13 is accommodated in the accommodating space, and is elastically suspended by the pair of elastic connectors 15. In the present embodiment, the vibrating system 13 includes a first vibrating unit 131, a second vibrating unit 133 and a flexible circuit board 134. The first vibrating unit 131 and the second vibrating unit 133 are opposite to and apart from each other, for example, the first vibrating unit and the second vibrating unit arranged in parallel along a direction perpendicular to the vibration direction. The first vibrating unit 131 is adjacent to the base 113, and is arranged between the second vibrating unit 133 and the base 113; the flexible circuit board 134 is clamped to the second vibrating unit 133.

The first vibrating unit 131 includes a magnet module 1311, a first mass member 1312 and a first pole plate 1312. As illustrated in FIG. 1, the first masse member 1312 includes a first main body, the first main body includes a through hole 13121 formed at a main central region thereof for receiving the magnet module 1311. The magnet module 1311 includes a plurality of parallel permanent magnets, the permanent magnets may be received in the through hole 13121 in such a manner that two adjacent permanent magnets have opposite magnetized directions. The first pole plate 1312 is placed on the base 11, and is attached onto a bottom of the magnet module 1311 and covers the through hole 13121.

The second vibrating unit 133 includes a second mass member 1331, a second pole plate 1332 and a coil assembly 1333. As illustrated in FIG. 1, the second mass member 1331 includes a second main body, the second main body includes a receiving groove formed at a bottom of a main central region thereof and facing the through hole 13121 of the first masse member 1312. The second coil plate 1332 is attached onto the coil assembly 1333, and both the second coil plate 1332 and the coil assembly 1333 are received in the receiving groove of the second mass member. The coil assembly 1333 may include a pair of coils arranged in parallel and facing the magnet module 1311, and each of the coils has a respective lead wire.

The flexible circuit board 134 may have a frame-like structure with a profile matching the second mass member 1331. The flexible circuit board 134 includes a main body placed on the second mass member 1331, a fixing part extending perpendicularly from an edge of the main body and being fixed to the supporting platform of the base 113, and two connecting ends extending towards the coil assembly 1333 in a U-shaped manner. The two connecting ends are further connected to the lead wires of the coil assembly 1333.

In the present embodiment, the flexible circuit board 134 is also accommodated in the accommodating space except for the fixing part thereof. The flexible circuit board 134 is configured for receiving and transmitting an electric signal to the coil assembly 1333, so that the vibrating system 13 can be driven to perform linear vibration in the accommodating space along a predetermined vibration direction.

The pair of elastic connectors 15 is separate from each other, and configured for elastically connecting two opposite ends of the vibrating system 13 with the shell 11. As illustrated in FIG. 2, each of the elastic connectors 15 may be connected between an end of the vibrating system 13 and a sidewall of the first cover 112.

Figure 3:
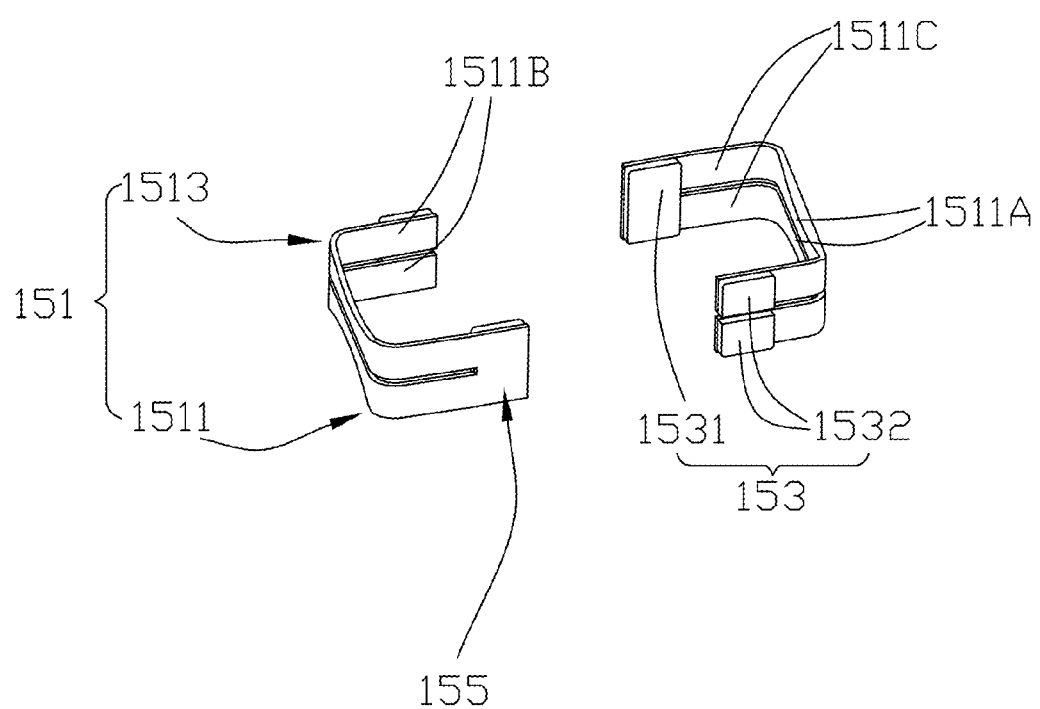
FIG. 3 is a schematic view of an elastic connector of the vibrating motor of FIG. 1.

Referring also to FIG. 3, specifically, each of the elastic connectors 15 includes a pair of elastic arms 151 and a fixing portion 155. The fixing portion 155 is fixed to a corresponding sidewall of the first cover 112, and the pair of elastic arms 151 extend from a same end of the fixing portion 155, and is arranged in parallel and apart from each other. In particular, the pair of elastic connectors 15 is reversely arranged, and thereby, the fixing portion 155 of one of the elastic connectors 15 is fixed to a sidewall of the first cover 112, while the fixing portion 155 of the other one of the elastic connectors 15 if fixed to an opposite sidewall of the first cover 112.

In the present embodiment, the pair of elastic arms 151 is defined as a first elastic arm 1511 for elastically suspending the first vibrating unit 131, and a second elastic arm 1513 for elastically suspending the second vibrating unit 133. Each of the first elastic arm 1511 and the second elastic arm 1513 includes a connecting portion 1511A, a first clamping portion 1511B, and a second clamping portion 1511C. The first clamping portion 1511B and the second clamping portion 1511C are opposite to each other, and may extend from two opposite ends of the connecting portion 1511A respectively to form a U-shape structure.

Moreover, the first clamping portion 1511B of the first elastic arm 1511 may be clamped to the first mass member 1312, and the first clamping portion 1511B of the second elastic arm 1513 may be clamped to the second masse member 1311. In addition, both the second clamping portions 1511C of the first elastic arm 1511 and the second elastic arm 1513 extends from the fixing portion 155 of the elastic connector 15, and is coplanar to the fixing portion 155.

Furthermore, each of the elastic connectors 15 may further include a plurality of gaskets 153; the gaskets 153 may serve as soldering flakes for soldering the elastic connectors 15 firmly in the accommodating space. For example, in the present embodiment, the plurality of gaskets 153 includes a fixing gasket 1531 and a pair of elastic arm gaskets 1532. The fixing gasket 1531 is attached on an inner surface of the fixing portion 155 and faces the vibrating system 13. One of the elastic arm gaskets 1532 is attached on an outer surface of the first clamping portion 1511B of the first elastic arm 1511, and the other one of the elastic arm gaskets 1532 is attached on an outer surface of the first clamping portion 1511B of the second elastic arm 1513. Moreover, both of the elastic arm gaskets 1532 are arranged away from the fixing portion 155, and face the corresponding sidewall of the first cover 132.

In the vibrating motor 1 as provided in the present disclosure, only a pair of elastic connectors 15, each of which includes two parallel elastic arms 1511 and 1513, is utilized to elastically suspending the vibrating system 13, therefore, an assembling complexity is reduced, and this can improve an assembly efficiency of the vibrating motor 1. Moreover, with the above configuration, a suspending function of the elastic connectors 15 can be improved, and a desired vibration intensity of the vibrating motor 1 can be obtained by making the elastic arm 1511 or 1513 with an appropriate size. Furthermore, the gaskets 153 can enables the elastic connectors to be firmly soldered in the vibrating motor 1, and thus a reliability and lifespan of the vibrating motor 1 can also be improved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibrating motor, comprising:
a shell providing an accommodating space;
a vibrating system accommodated in the accommodating space; and
a pair of elastic connectors for elastically connecting two opposite ends of the vibrating system with the shell;
wherein the vibrating system comprises a first vibrating unit and a second vibrating unit opposite to each other; each of the elastic connectors comprises a fixing portion, a first elastic arm and a second elastic arm, the fixing portion is fixed to the shell; the first elastic arm and the second elastic arm are parallel to each other and extend from a same end of the fixing portion, and are configured for elastically suspending the first vibrating unit and the second vibrating unit respectively.

2. The vibrating motor as described in claim 1, wherein each of the first elastic arm and the second elastic arm has a U-shape structure.

3. The vibrating motor as described in claim 1, wherein each of the first elastic arm and the second elastic arm comprises a connecting portion, a first clamping portion and a second clamping portion, the first clamping portion and the second clamping portion are opposite to each other, and extend from two opposite ends of the connecting portion respectively.

4. The vibrating motor as described in claim 3, wherein the first clamping portions of the first elastic arm and the second elastic arm are clamped to the first vibrating unit and the second vibrating unit respectively.

5. The vibrating motor as described in claim 4, wherein both the second clamping portions of the first elastic arm and the second elastic arm extend from the fixing portion, and coplanar to the fixing portion.

6. The vibrating motor as described in claim 3, wherein each of the elastic connectors comprises a fixing gasket, a first elastic arm gasket and a second elastic arm gasket; the fixing gasket is attached on an inner surface of the fixing portion and faces the vibrating system, the first elastic arm gasket and the second elastic arm are respectively attached on the first clamping portions of the first elastic arm and the second elastic arm, and are arranged away from the fixing portion.

7. The vibrating motor as described in claim 6, wherein the fixing gasket, the first elastic arm gasket and the second elastic arm gasket are soldering flakes for soldering the elastic connector in accommodating space.

8. The vibrating motor as described in claim 1, wherein the pair of elastic connectors is reverse to each other; and the fixing portions of the pair of are fixed to two opposite sidewall of the shell respectively.

9. The vibrating motor as described in claim 1, wherein the shell comprises a first cover and a base, the first cover covers the base for forming the accommodating space.

10. The vibrating motor as described in claim 9, wherein the shell further comprises a second cover covering the base and arranged outside of the first cover.

11. The vibrating motor as described in claim 9, wherein the first vibrating unit is adjacent to the base, and is arranged between the second vibrating unit and the base.

12. The vibrating motor as described in claim 11, wherein the first vibrating unit comprises a first masse member with a through hole, a magnet module received in the through hole, and a first pole plate attached to a bottom of the magnet module and covering the through hole.

13. The vibrating motor as described in claim 12, wherein the magnet module comprises a plurality of permanent magnets arranged in parallel, and two adjacent permanent magnets of the magnet module have opposite magnetized directions.

14. The vibrating motor as described in claim 11, wherein the second vibrating unit comprises a second mass member with a receiving groove facing the through hole, a coil assembly received in the receiving groove, and a second pole plate attached to the coil assembly.

15. The vibrating motor as described in claim 14, wherein the coil assembly comprises a pair of coils arranged in parallel and facing the magnet module of the first vibrating unit, each of the pair of coils comprises a lead wire.

16. The vibrating motor as described in claim 15, wherein the vibrating system further comprises a flexible circuit board clamped to the second vibrating unit.

17. The vibrating motor as described in claim 16, wherein the flexible circuit board has a frame-like structure with a profile matching the second mass member.

18. The vibrating motor as described in claim 17, wherein the flexible circuit board comprises a main body placed on the second mass member, a fixing part extending perpendicularly from an edge of the main body and being fixed to the base, and two connecting ends extending towards the coil assembly in a U-shaped manner and connected to the lead wires of the pair of coils.

* * * * *